(12) United States Patent
Serna-Gongora et al.

(10) Patent No.: US 8,381,361 B2
(45) Date of Patent: Feb. 26, 2013

(54) HOLDING SYSTEM FOR A LINE ASSEMBLY

(75) Inventors: Percy Serna-Gongora, Hamburg (DE); Dieter Borschke, Lueneburg (DE); Jurijs Zambergs, Tornesch (DE)

(73) Assignee: Airbus Deutschland GmbH, Hamburg (DE)

( * ) Notice: Subject to any disclaimer, the term of this patent is extended or adjusted under 35 U.S.C. 154(b) by 721 days.

(21) Appl. No.: 12/316,443

(22) Filed: Dec. 12, 2008

(65) Prior Publication Data

US 2009/0158560 A1    Jun. 25, 2009

Related U.S. Application Data

(60) Provisional application No. 61/008,487, filed on Dec. 20, 2007.

(51) Int. Cl.
*B65D 63/02* (2006.01)

(52) U.S. Cl. ........................... 24/20 R; 248/74.3
(58) Field of Classification Search .................. 24/20 R, 24/20 EE, 23 W; 285/420, 61–64; 248/74.3, 248/228.8, 230.8, 74.1, 205.3
See application file for complete search history.

(56) References Cited

U.S. PATENT DOCUMENTS

| | | | | |
|---|---|---|---|---|
| 2,438,362 A | * | 3/1948 | Dunkelberger et al. | .. 174/40 CC |
| 4,882,814 A | * | 11/1989 | Takahashi | ............... 24/20 R |
| 5,192,039 A | * | 3/1993 | Williams | .................. 248/62 |
| 5,195,788 A | * | 3/1993 | Oetiker | ................... 285/252 |
| 5,354,021 A | | 10/1994 | Farrell | |
| 5,622,391 A | * | 4/1997 | Belik | ........................ 285/23 |
| 6,088,886 A | * | 7/2000 | Gyongyosi | ................. 24/279 |
| 6,343,772 B1 | * | 2/2002 | Oi | ............................. 248/75 |
| 7,395,582 B2 | * | 7/2008 | Bowers | ................... 24/20 W |
| 2007/0272806 A1 | * | 11/2007 | Kim | ............................ 248/62 |
| 2008/0010783 A1 | * | 1/2008 | Bowers | ................... 24/20 W |
| 2009/0265895 A1 | * | 10/2009 | Box | ........................... 24/20 R |

FOREIGN PATENT DOCUMENTS

| | | |
|---|---|---|
| DE | 202 14 072 | 2/2003 |
| DE | 10 2004 014 892 | 3/2005 |
| EP | 1 455 130 | 9/2004 |
| JP | 2000-161538 | 6/2000 |

OTHER PUBLICATIONS

Office action filed in corresponding DE application 10 2007 061 424.4-24.
Minutes of hearing filed in corresponding DE application 10 2007 061 424.3.

* cited by examiner

*Primary Examiner* — Victor Batson
*Assistant Examiner* — Matthew Sullivan
(74) *Attorney, Agent, or Firm* — Greer, Burns & Crain Ltd.

(57) ABSTRACT

A holding system for fixing a line assembly includes a fixing band, and a fixing band retaining element, which is arranged on the line assembly and comprises at least one guiding element for receiving the fixing band, the fixing band retaining element comprising two ends, one end being provided with at least one or more cavities or recesses, into which the other end can be plugged or hooked.

17 Claims, 13 Drawing Sheets

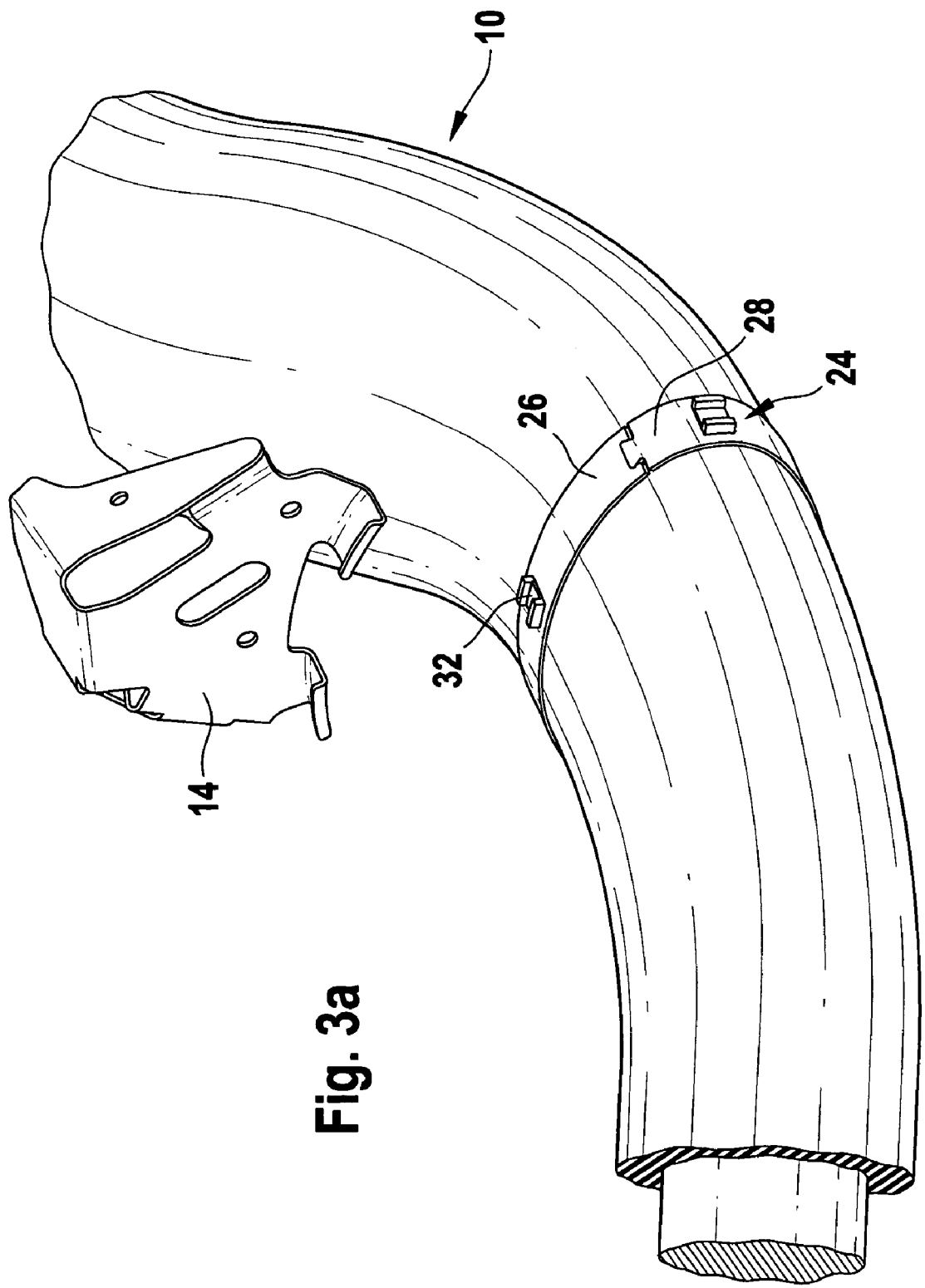

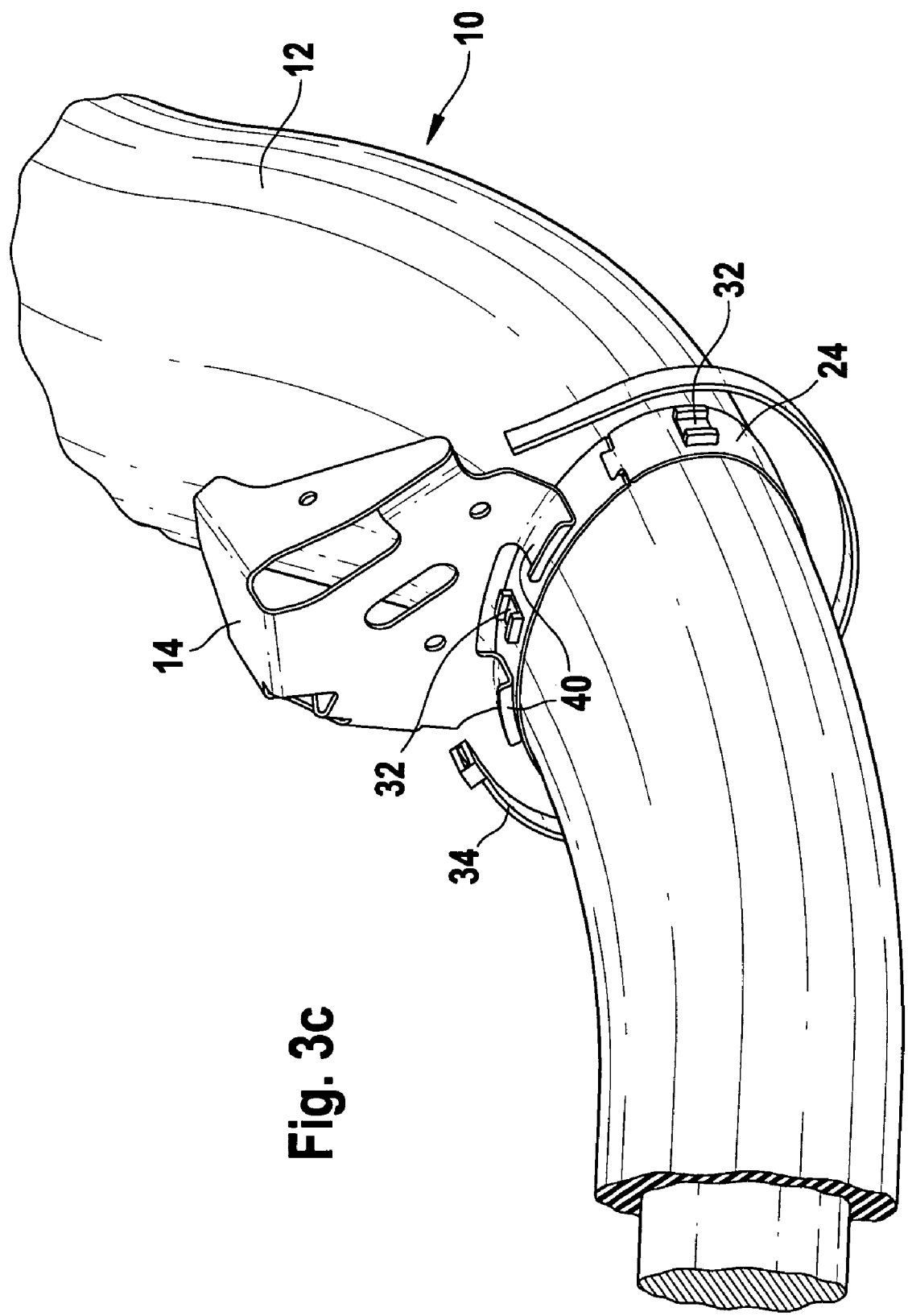

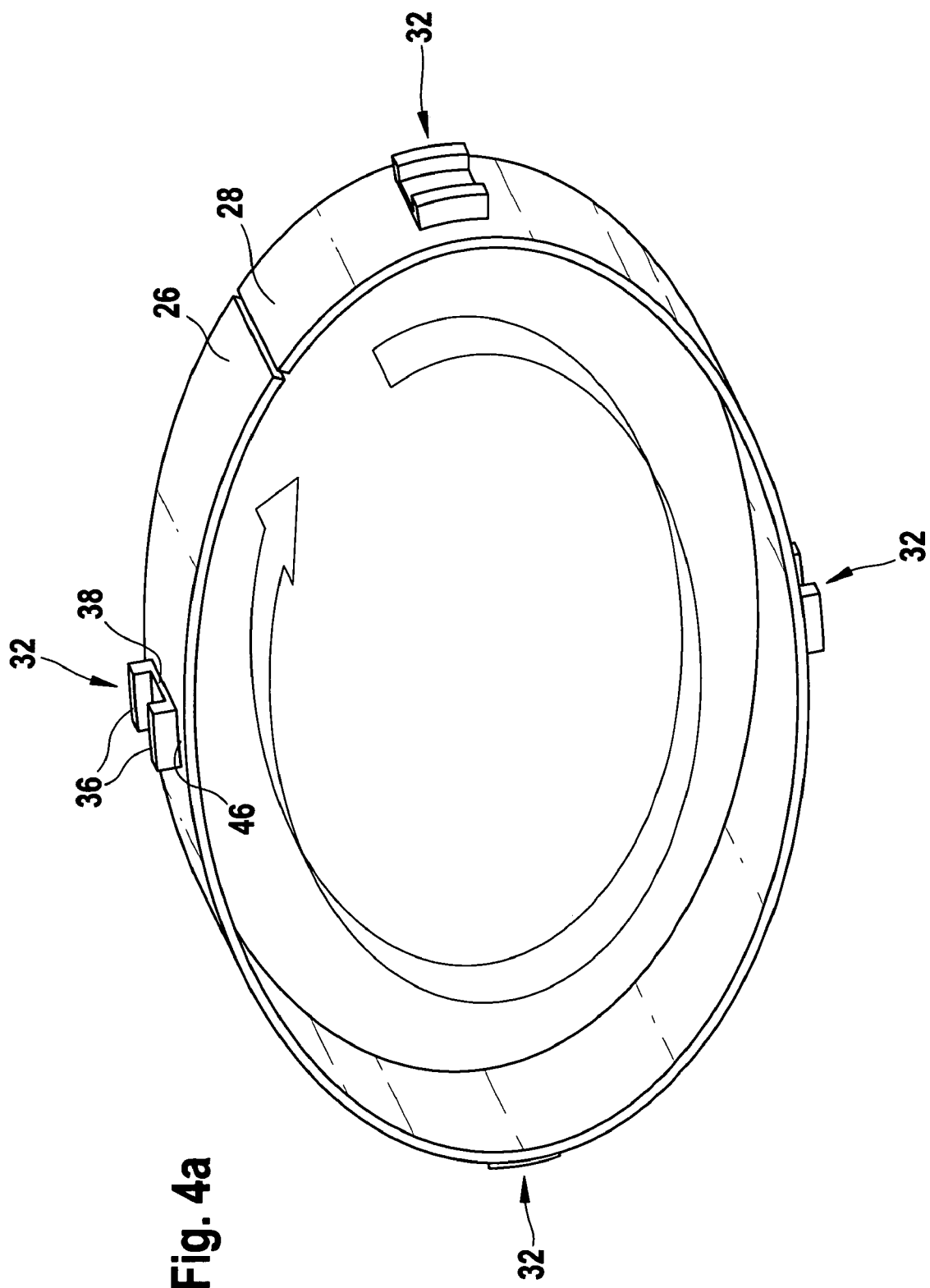

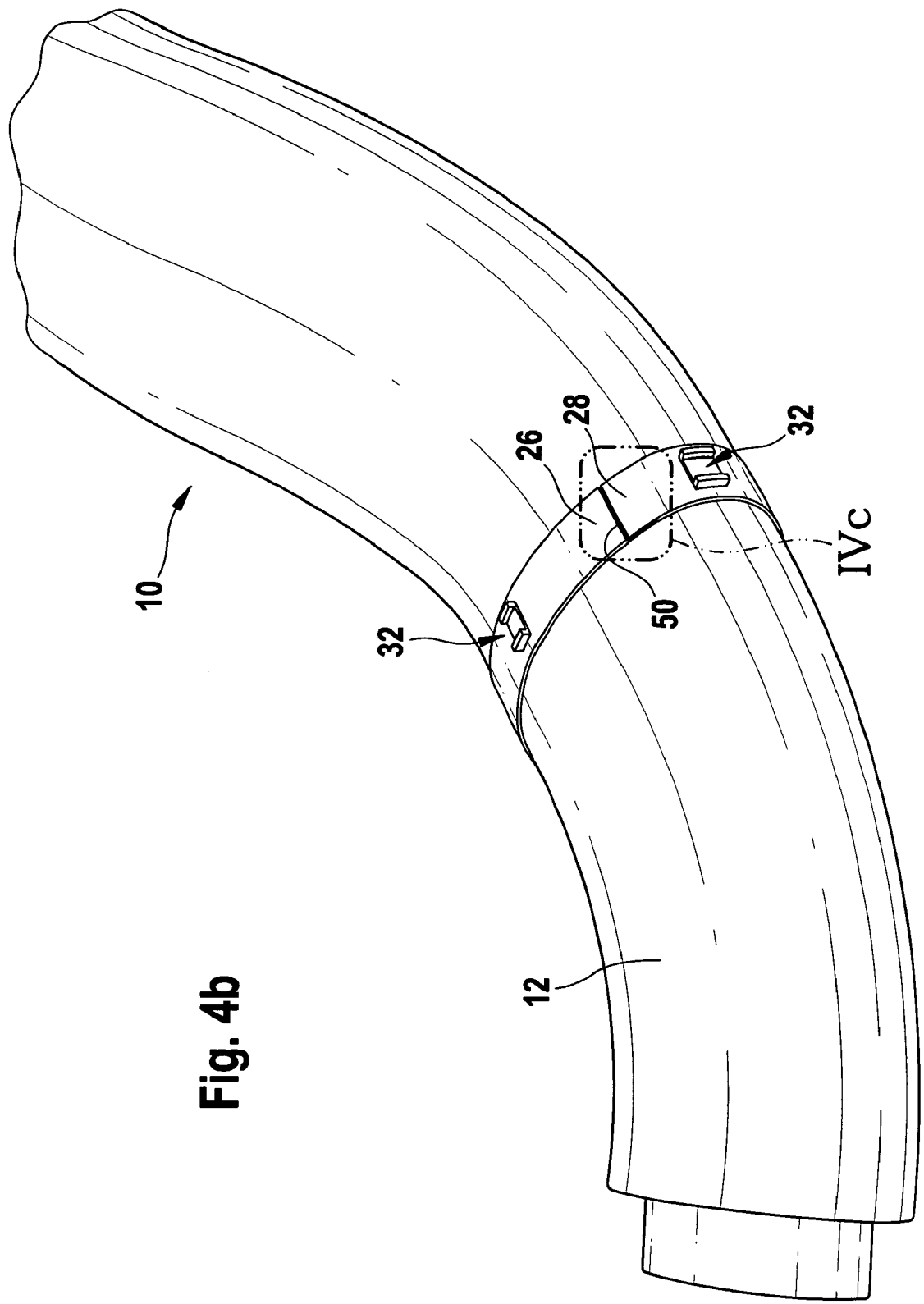

HOLDING SYSTEM FOR A LINE ASSEMBLY

CROSS-REFERENCE TO RELATED APPLICATIONS

This application claims the benefit of U.S. Provisional Application No. 61/008,487, filed Dec. 20, 2007, the entire disclosure of which is herein incorporated by reference.

FIELD OF THE INVENTION

The present invention relates to a holding system for fixing a line assembly, for example a silencing hose or a silencing tube.

BACKGROUND OF THE INVENTION

Generally, when fixing line assemblies such as electrical lines or lines for the air-conditioning system or ventilation in aircraft, rigid silencing lines, such as silencing tubes, are used in order to prevent or dampen any rattling of the line assembly on the one hand and, on the other hand, to protect the line assembly from being damaged. Alternatively, instead of silencing tubes of this type, silencing hoses may also be used. In this context it is known from the prior art to fix silencing hoses of this type to the hull of an aircraft using rub-proof tape and what is known as a tie wrap holder for example. However, vibrations may lead to the silencing hose sliding out of its holder and being damaged.

SUMMARY OF THE INVENTION

It is one of the objects of the present invention to provide an improved holding system, with which a line assembly can be securely fixed to a holder.

Accordingly, a holding system for fixing a line assembly, in particular in an aircraft or spacecraft, is provided that comprises:
 a fixing band; and
 a fixing band retaining element, which is arranged on the line assembly and comprises at least one guiding element for receiving the fixing band, the fixing band retaining element comprising two ends, one end being provided with at least one or more cavities or recesses, into which the other end can be plugged or hooked.

Furthermore, a holding system for fixing a line assembly, in particular in an aircraft or spacecraft, is provided that comprises:
 a fixing band; and
 a fixing band retaining element, which is arranged on the line assembly and comprises at least one guiding element for receiving the fixing band, the fixing band retaining element comprising two ends, an adhesive tape being provided in a portion in the region of the ends for connecting the ends, and/or at least a further portion of the adhesive tape being arranged on the lower side of the fixing band retaining element.

The idea underlying the present invention consists of providing a holding system with which the fixing band can be prevented from rubbing through and, at the same time, secure fixing is achieved since the fixing band is prevented from slipping off.

This is achieved in that a fixing band retaining element is provided on the line assembly and is provided with at least one guiding element so as to guide the fixing band therein in such a way that it cannot slip off unintentionally once it has been fixed to a holder. This may also have the advantage that the fixing band cannot rub through the line assembly and the holding system also cannot unintentionally release itself from the holder.

Accordingly, a holding system is provided with which a line assembly can be securely fixed to a holder.

According to one embodiment of the invention, the guiding element includes two protrusions, between which the fixing band can be received or also can be clamped or locked in place. The protrusions have the advantage that they are easy to produce as guiding elements and they fix the fixing band on both sides in such a way that it cannot slip off unintentionally.

According to a further embodiment according to the invention, the two protrusions are arranged on a base, of which the height corresponds substantially, for example, to the height of a holding portion of a holder, to which holding portion the line assembly is fixed by the holding system. This may have the advantage that the fixing band abuts the holder and the guiding element substantially completely in such a way that the fixing band can be suitably clamped to the holder.

In a further embodiment according to the invention, one or both protrusions of at least one guiding element is/are configured in such a way that the fixing band can be locked in place therein. For this purpose, the protrusions may be provided, for example, with an undercut. This may have the advantage that the fixing band can also be fixed and held in the guiding element as well as being sufficiently supported on the holder.

In another embodiment according to the invention, two, three, four, five or more guiding elements are provided on the fixing band retaining element. The guiding elements may be arranged so as to be distributed over the periphery of the fixing band retaining element in such a way that the fixing band is sufficiently guided over the entire periphery of the fixing band retaining element.

According to a further embodiment according to the invention, the fixing band retaining element is configured so as to be wider than the guiding element on one or both sides. This may have the advantage that, when the guiding element is, for example, comparatively slender, the fixing band retaining element can be better supported laterally when lateral forces act on the guiding element. The fixing band retaining element can thus also be prevented from twisting.

In another embodiment according to the invention, the fixing band retaining element which is configured so as to be peripheral, at least in part, comprises two ends or is configured as an annular element. The length of the ends may be selected in such a way that they substantially completely surround the line assembly, for example, or form a small ring so as to compensate for differences in tolerance in the diameter of the line assembly.

In a further embodiment according to the invention, the ends may each comprise a flattened end portion, the flattened end portions of the two ends being able to be brought into engagement with one another and being able to be connected to one another, for example by adhesive tape or an adhesive. The fixing band retaining element can thus be simply fixed rigidly on the line assembly. The fixing band retaining element may also optionally be secured, at least in a portion, via its inner wall to the outer wall of the line assembly and additionally be fixed in this way.

In another embodiment according to the invention, the ends of the fixing band retaining element are configured as a plug-in or hook-in connection and are configured so as to be able to be plugged or hooked into one another. In this case, one end with at least one or more cavities or recesses may be provided into which the other end may be plugged or hooked. This may have the advantage that the two ends can be held together even without an adhesive connection. The plurality of recesses or cavities also allows the fixing band retaining element to be adjusted to various diameters of the line assembly.

According to a further embodiment according to the invention, the fixing band retaining element is flexible or at least flexible in part. The fixing band retaining element may optionally also be configured so as to be resilient or at least resilient in part, so as to also be able to compensate for differences in tolerance. The fixing band retaining element may, for example, be made of silicone, rubber, plastics material and/or metal or a sheet metal.

In a further embodiment according to the invention a cable tie or tie wrap or a type of cable clip or clamp may be used as a fixing band.

BRIEF DESCRIPTION OF THE DRAWINGS

The present invention is explained in more detail below using preferred exemplary embodiments and with reference to the attached figures of the drawings, in which:

FIG. 4a is a perspective view of a first embodiment of a fixing band retaining element according to the invention, FIG. 4b is a perspective view of a second embodiment of the fixing band retaining element according to the invention.

In the figures, the same reference numbers refer to identical or functionally identical components unless otherwise stated.

DETAILED DESCRIPTION OF THE INVENTION

Figure 1A:
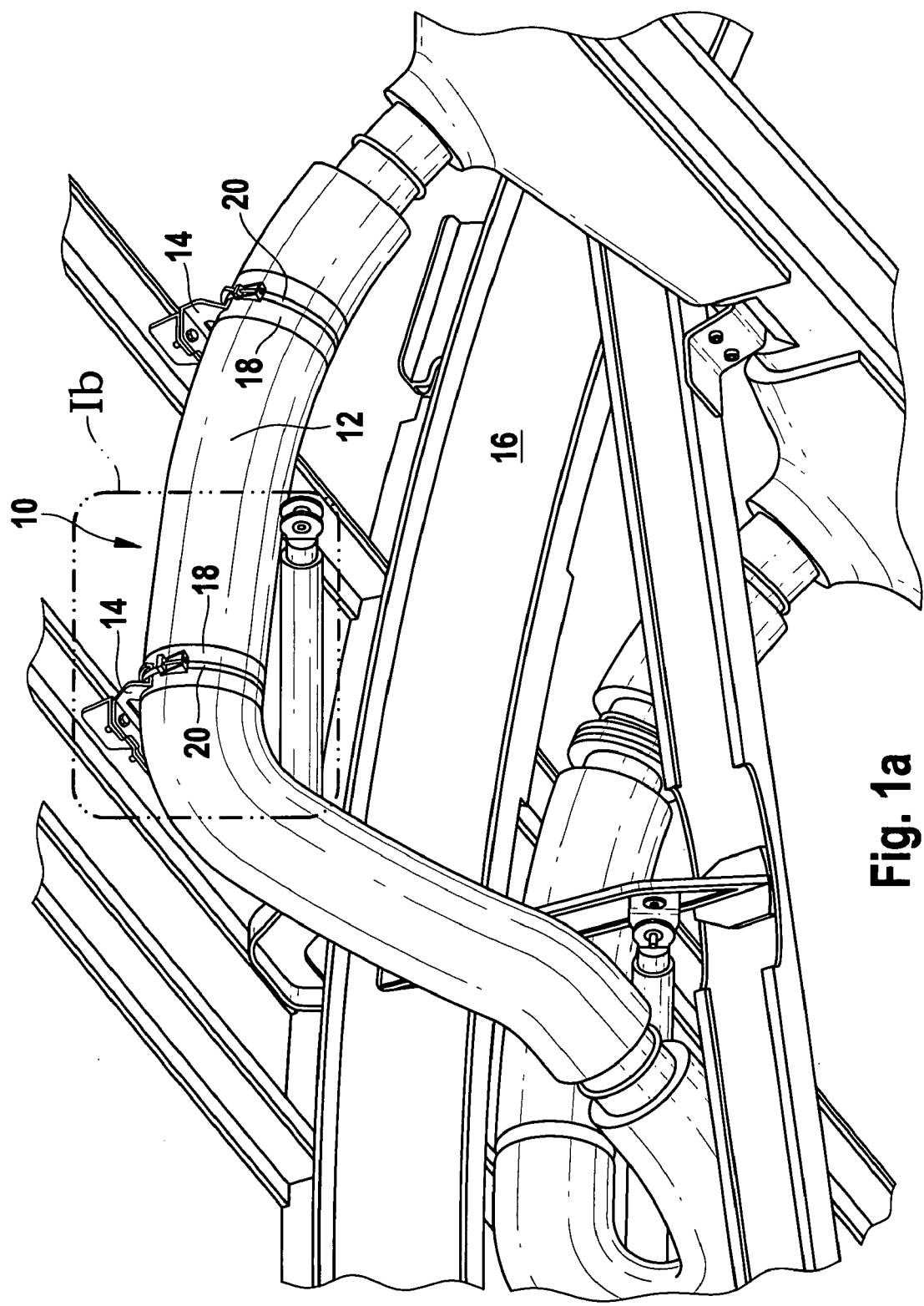
FIG. 1a is a perspective view of a silencing hose and its fixing in the hull of an aircraft.
Figure 1B:
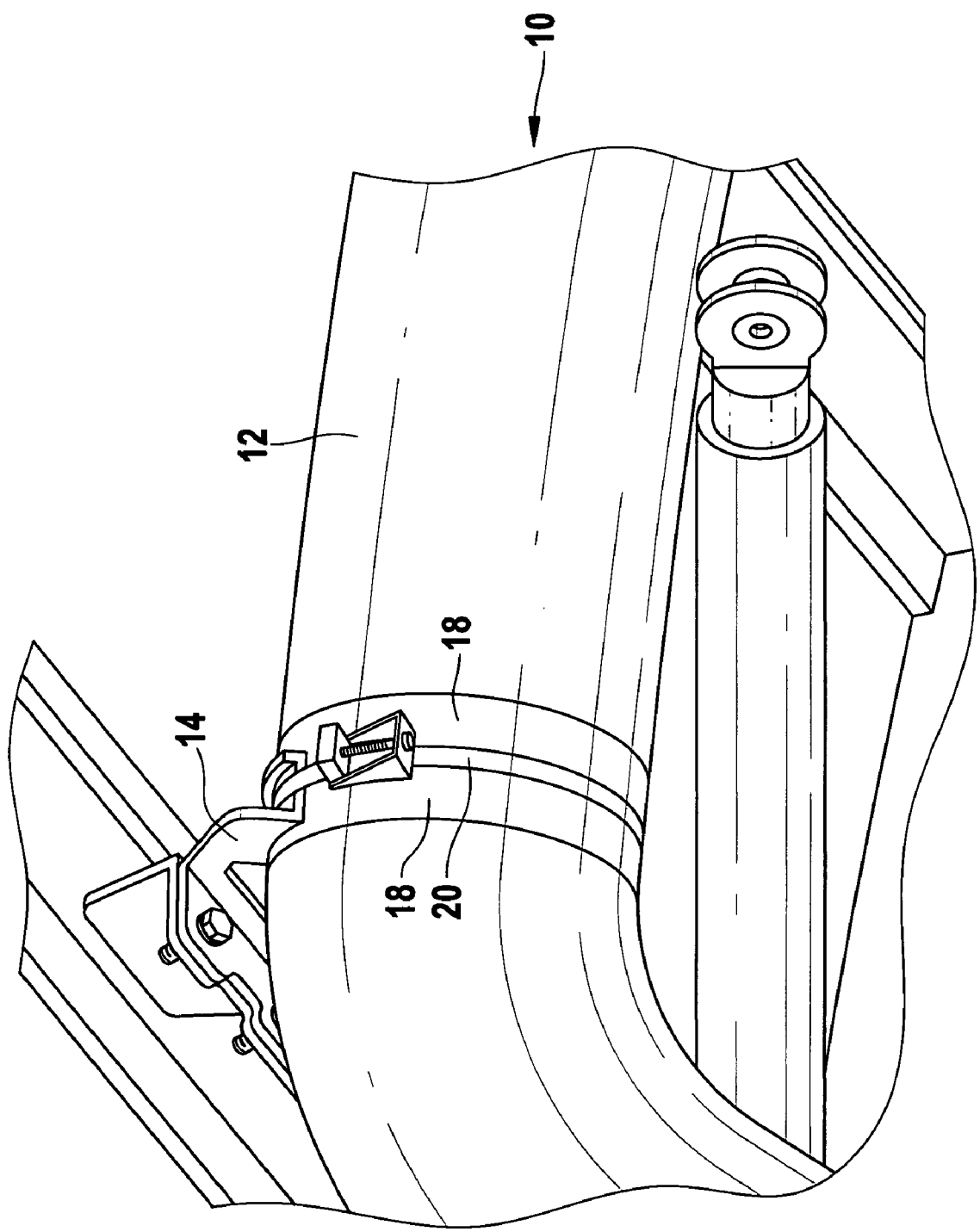
FIG. 1b is a detailed view of the silencing hose and its fixing according to FIG. 1a, FIG. 2a is a perspective view of a line assembly with a holding system according to the invention for the fixing thereof.

FIGS. 1a and 1b show the known fixing of a line assembly 10, such as a silencing hose 12, to a holder 14.

A silencing hose 12 of this type is arranged so as to surround lines, such as electrical lines or lines which transport, for example, liquid or gaseous media, in order to prevent the lines from rattling and becoming tangled together on the one hand and, on the other hand, to also protect them, for example from external damage.

The silencing hose 12 is, in this case, fixed, for example, to the stringers or formers 16 of the hull of an aircraft by the holder 14, as shown in FIG. 1a. A rub-proof tape 18, shown in FIG. 1b, is firstly stuck onto the outer face of the silencing hose 12. In order to fix the silencing hose 12, what is known as a tie wrap 20 is subsequently used, by which the hose is securely clamped to the holder 14. The rub-proof tape 18 prevents the hose 12 from being rubbed through.

Figure 2A:
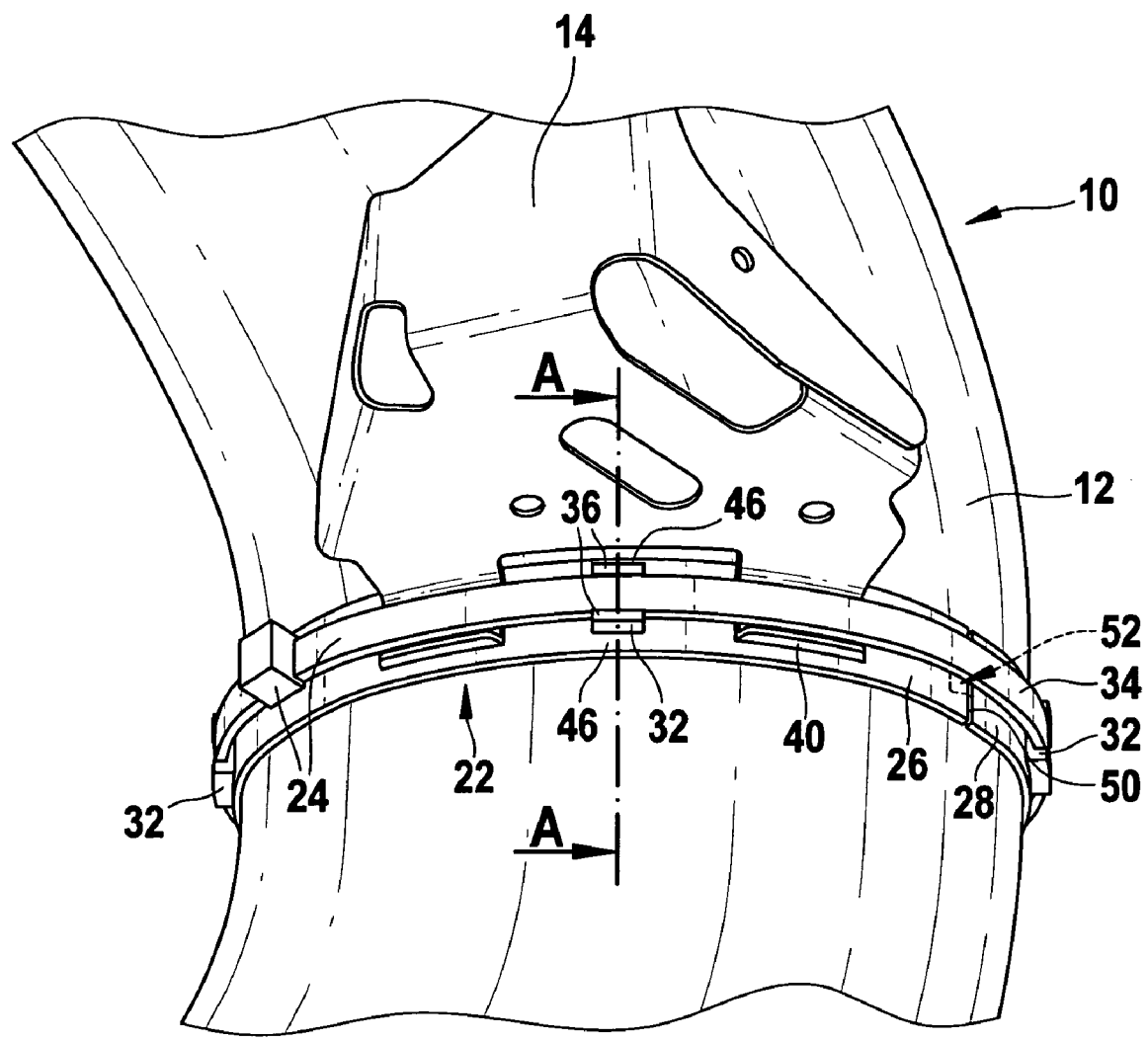
FIG. 2b is a further perspective view of the line assembly with the holding system according to FIG. 2a, FIG. 2c is a sectional view along line A-A through the line assembly and the holding system according to FIG. 2a, FIGS. 3a-d show a sequence of steps for fixing the line assembly by the holding system according to the invention.
Figure 2B:
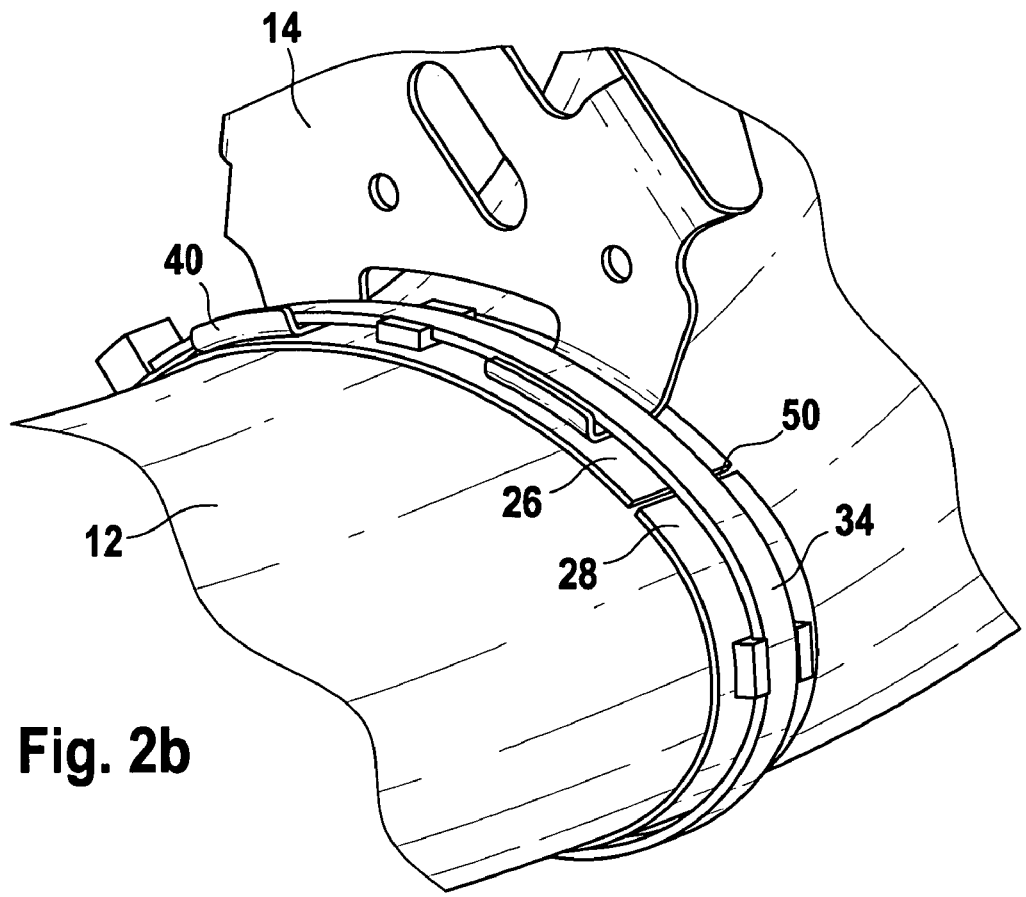
Figure 2C:
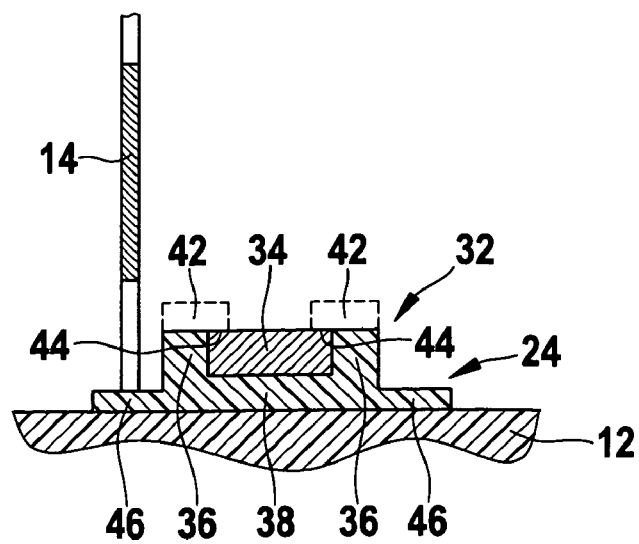

FIGS. 2a and 2b show two perspective views of a line assembly 10, in this case a silencing hose 12, which is fixed by a holding system 22 according to the invention to a holder 14 in an aircraft. Furthermore, FIG. 2c shows a sectional view along line A-A through the holding system 22, the line assembly 10 and the holder 14 according to FIG. 2a.

The holding system 22 according to the invention comprises a fixing band retaining element 24 which is arranged on the line assembly 10 to be fixed, i.e. in this case the silencing hose 12. The fixing band retaining element 24 may comprise, for example, two ends 26, 28 which can be fixed to one another via an adhesive tape 30, as shown in FIG. 5b. The adhesive tape 30 may, in this case, be a one-sided or double-sided adhesive tape. Additionally or alternatively, the fixing band retaining element 24 may also be adhered to the outer face of the silencing hose 12, at least in one or more portions. The ends 26, 28 of the fixing band retaining element 24 may also be configured in such a way that they can be assembled together, as shown in FIGS. 2a and 5b, so as to be interconnected. At least this portion of the fixing band retaining element 24 may optionally also be secured with a one-sided or double-sided adhesive tape 30.

Alternatively to the fixing band retaining element 24 with two ends 26, 28, an annular resilient fixing band retaining element (not shown) may also be provided which can be fitted onto the line assembly 10 as a type of rubber ring.

The fixing band retaining element 24 according to the invention comprises a plurality of guiding elements 32, in which a fixing band 34 can be placed or inserted so as to fix the silencing hose 12 to a holder 14. The guiding elements 32 are configured in such a way that the fixing band 34 may be guided therein, as shown in FIGS. 2a to 2c. For this purpose, the guiding elements 32 are each configured, for example, as oblong protrusions 36 on the fixing band retaining element 24, the fixing band 34 being arranged between the protrusions 36. The protrusions 36 may, in this case, optionally be arranged on a base 38 which, in the assembled state, forms, for example, a substantially planar surface together with a holding portion or holding portions 40 of the holder 14. This may have the advantage that, when fixing the holder 14 and the fixing band retaining element 24, the fixing band 34 abuts them in a particularly uniform manner.

The protrusions 36 configured so as to be oblong, as shown in FIGS. 2a and 2b, provide a guide for the fixing band 34. In principle, the protrusions 36 may also be of any other shape, arrangement and number which is suitable for guiding the fixing band 34 in such a way that it cannot substantially slip off unintentionally.

Alternatively or additionally, the respective guiding element 32 and at least one or both protrusions 36 may also be configured as a locking element 42, in which the fixing band 34 can be locked into place, as is shown by way of a dashed line in FIG. 2c. In this case, both protrusions 36 comprise, for example, an undercut 44 in which the fixing band 34 can be locked into place.

The fixing band retaining element 24, as shown for example in FIGS. 2a to 2c, may project on one or both sides of the guiding element 32 with a portion 46 or may finish in line with the guiding elements 32 on one or both sides. The projecting portions 46 have the advantage that the fixing band retaining element 24 can better absorb forces acting, for example, laterally on the guiding elements 32. An unintentional twisting of the fixing band retaining element 24 and thus an unintentional release of the fixing band retaining element 24 from the silencing hose 12 may also be resisted.

Figure 3B:
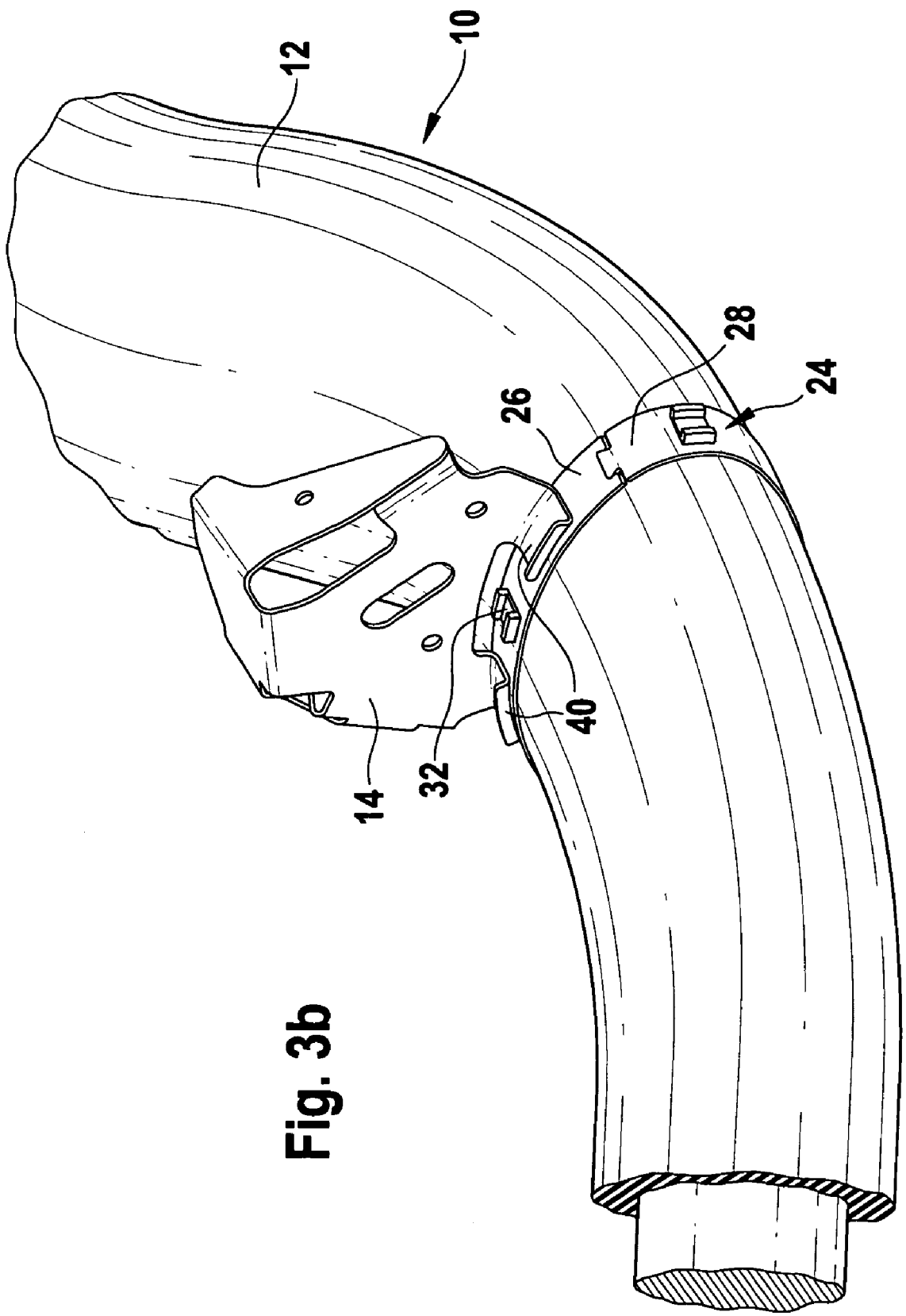
Figure 3D:
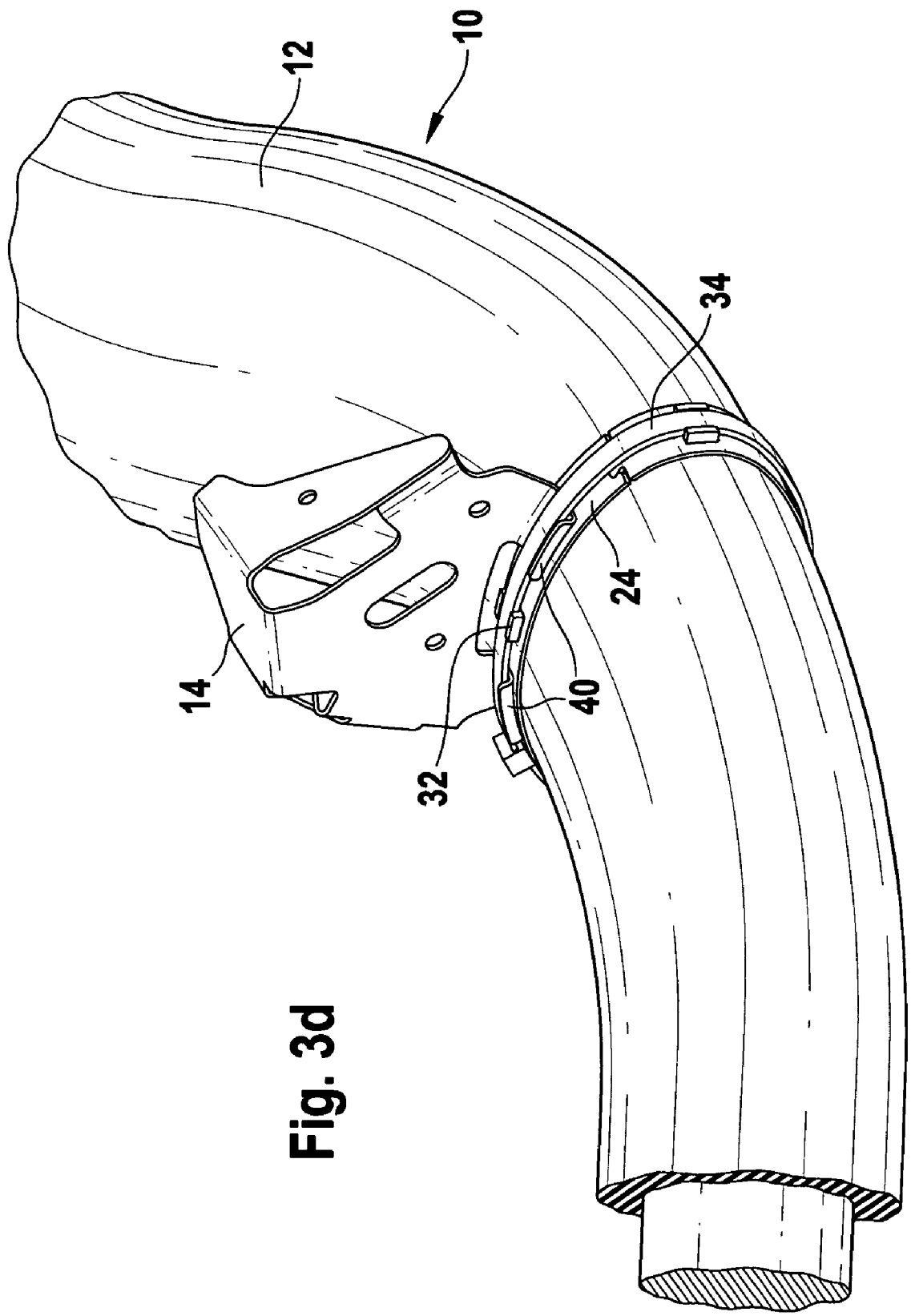

In order to fix the silencing hose 12 to a holder 14 or clamp, as shown in FIGS. 3a and 3b, the holder 14 is initially arranged on the fixing band retaining element 24. The holder 14 may therefore comprise, for example, two projecting holder portions 40. The holder 14 is, for example, arranged on the fixing band retaining element 24 in such a way that at least one guiding element 32 of the fixing band retaining element 24 is arranged between the two holder portions 40 of the holder 14. In the next step, as shown in FIG. 3c, the fixing band 34 is placed or locked in the holder portions 40 of the holder 14 and in the respective guiding elements 32 of the fixing band retaining element 24. Subsequently, the fixing band 34 is securely clamped in order to rigidly fix the silencing hose 12 to the holder 14. The holder 14 itself may, for example, be fixed in the hull of an aircraft to a corresponding stringer or former 16, as shown for example in FIG. 1a.

As is shown in FIGS. 2a to 2c and 3a to 3d, the holder 14 is configured, for example, as a clamp comprising two holder portions 40 angled at 90°, of which the ends are bent slightly upwards so as to receive the fixing band 34. The holder 14 may, however, also be of any other shape so as to fix a line assembly 10.

In FIG. 4a, the fixing band retaining element 24 is shown in a perspective view and in this case comprising two ends 26, 28. The fixing band retaining element 24 may be shaped so as to be adapted, for example, to the outer contour of the line assembly 10, in this case an elliptical or oval silencing hose 12. In this case, the fixing band retaining element 24 may, for example, be configured so as to be flexible or at least flexible in part. Furthermore, the fixing band retaining element 24 may optionally also be configured so as to be resilient or at least resilient in part.

The length of the fixing band retaining element 24 is such that, with its two ends 26, 28, it can substantially completely surround the line assembly 10, in this case the silencing hose 12, as shown in FIG. 4a.

Figure 4C:
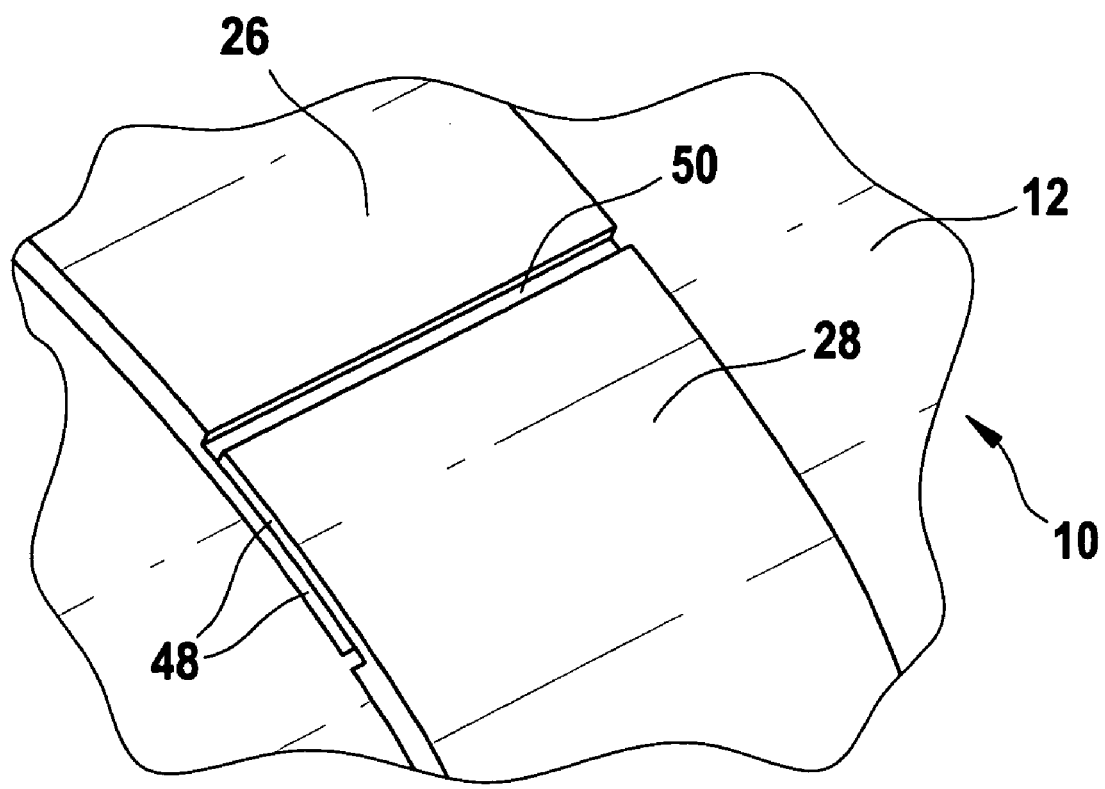
FIG. 4c is a detailed view of the ends of the fixing band retaining element according to FIG. 4b.

In an alternative embodiment, as shown in FIGS. 4b and 4c, the two ends 26, 28 may also overlap one another. The ends 26, 28 may thus optionally comprise a flattened or stepped portion 48. The flattened portions 48 of the two ends 26, 28 may, in this case, as shown in FIG. 4c, be substantially as thick as the fixing band retaining element 24, for example when overlapped, in such a way that there is substantially no bulge at this portion of the fixing band retaining element 24. The fixing band retaining element 24 may, for example, be adhered together at its ends 26, 28 by a double-sided adhesive tape 30 or adhesive. Alternatively or additionally, the fixing band retaining element 24 may also be fixed, at least in a portion, on its inner face to the silencing hose 12 by the double-sided adhesive tape 30 or an adhesive, as shown for example in FIG. 5b.

In the embodiments of the fixing band retaining element 24 described above, the length of the fixing band retaining element 24 may, for example, be selected in such a way that a small gap 50 remains between the two ends 26, 28 or the two overlapping ends 26, 28. The gap 50 may have the advantage that differences in tolerance in the diameter of the line assemblies 10 can be compensated for. In this manner, the ends 26, 28 of the fixing band retaining element 24 cannot overlap, for example in the case of a line assembly 10 having a somewhat smaller diameter, in such a way that one end projects beyond the other, thus resulting in an uneven fixing band retaining element 24.

As can further be seen from FIG. 4a, four guiding elements 32, for example, are provided and are each arranged, for example, at a distance of 45° from one another. However, the number and arrangement of the guiding elements 32 is purely exemplary. According to the invention, one or more guiding elements 32 may be provided, including fewer or more than four. Furthermore, the guiding elements 32 may be arranged on the fixing band retaining element 24 either at regular distances or at irregular distances from one another depending on the functional purpose or application.

Figure 5A:
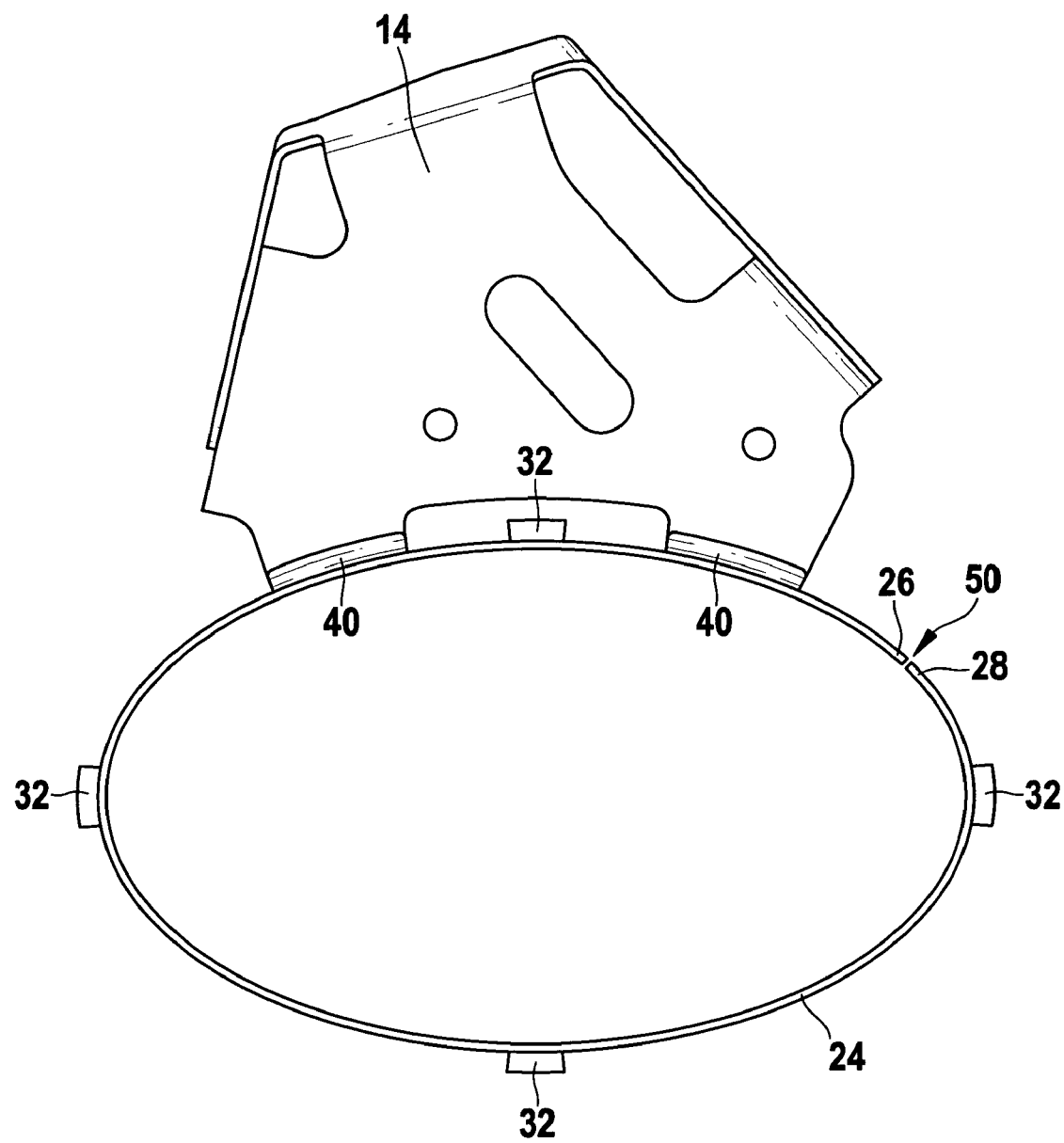
FIG. 5a is a perspective view of the first embodiment of the fixing band retaining element according to FIG. 4a and an adhesive tape for fixing the fixing band retaining element.
Figure 5B:
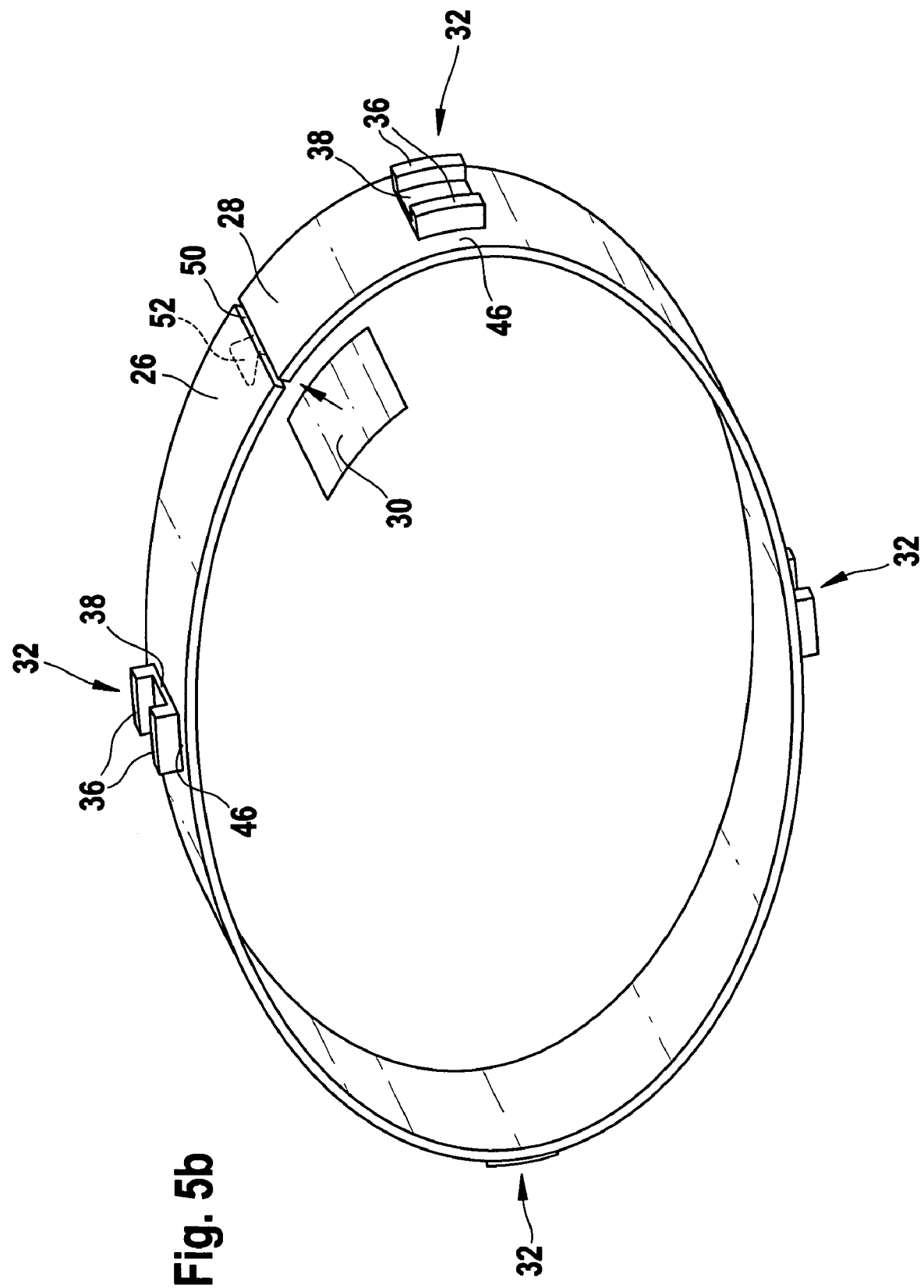
FIG. 5b is a side view of the fixing band retaining element according to FIG. 5a and a holder to which the fixing band retaining element can be fixed.

In FIGS. 5a and 5b, the fixing band retaining element 24 is shown according to the first embodiment, in which the ends 26, 28 do not overlap one another. Furthermore, the holder 14 is shown which is connected to the fixing band retaining element 24. The two holding portions 40 of the holder 14 may be arranged, for example, on the fixing band retaining element 24 in such a way that a guiding element 32 of the fixing band retaining element 24 is positioned between the two holder portions 40. This may have the advantage that the fixing band 34, which extends over the holder portions 40, can also be held in position by the guiding element 32 and thus cannot unintentionally slip off the holder portions 40 and therefore the connection between the holder 14 and the line assembly 10 cannot be released. The holder 14 is purely exemplary. In principle, the holding system 22 according to the invention may be used for a plurality of holders 14 or clamps in order to fix a line assembly 10 thereto.

In FIG. 5b, a perspective view of the fixing band retaining element 24 according to the first embodiment is shown, the fixing band retaining element 24 in this case being provided in the region of the ends 26, 28 with an adhesive tape 30 or an adhesive film which rigidly connects the two ends together. The adhesive tape 30 may be configured so as to be adhesive on one or both sides.

In a third embodiment, the two ends 26, 28 are configured in such a way that they form a type of dovetail or plug-in connection 52 as shown in FIG. 2a and indicated in FIG. 5b with a dashed line. The two ends 26, 28 may be inserted into one another in such a way that they cannot be released unintentionally from one another. The two ends 26, 28 may also optionally be adhered together by the adhesive tape 30. The plug-in connection 52, as shown in FIGS. 2a and 5b, is purely exemplary. It is obvious to the person skilled in the art that the plug-in connection 52 of this type may be varied in numerous ways. Thus, one end 26 may be provided, for example, with a round portion (not shown) which can be inserted into a correspondingly round recess in the other end 28 so as to rigidly hold the two ends together. In this case, an adhesive tape 30 or adhesive film for holding the ends 26, 28 together does not necessarily have to be provided. In a further alternative embodiment (not shown) it is also conceivable to configure one end 26 in the form of a hook (not shown) which can be hooked into a corresponding recess or cavity in the other end 28 so as to securely connect the two ends together. In this case, a plurality of recesses or cavities may also be provided in one end 26 and a plurality of hooks in the other end 28 so as to achieve, for example, various diameters of line assemblies 10. The ends 26, 28 may thus be shaped in such a way that they are substantially as thick as the rest of the fixing band retaining element when connected together. In principle, the ends 26, 28 may, however, also be thinner or thicker. This applies to all embodiments.

In the case of the aforementioned holding system 22 according to the invention, a silicone band may, for example, be used as a fixing band retaining element 34. However, a rubber band may also be used or a plastics material band or a metal band, etc. or a combination thereof. Furthermore, a cable tie or tie wrap or another suitable band or another suitable fixing device, such as a cable clip or clamp or fastener may be used as a fixing band 34. As described above, as a line assembly 10 at least one silencing hose 12 may be fixed to the holding system 22 according to the invention. However, it is obvious that the holding system 22 according to the invention may also be used for any other type of wiring or lines. Examples of this are electrical lines and lines for transporting liquid or gaseous media, etc., to name just a few.

Although the present invention has been described with reference to preferred embodiments, it is not limited thereto and may be modified in various ways. In particular, the aforementioned embodiments for the holding system according to the invention may be combined with one another and, in particular, individual features thereof may be combined.

The present invention relates to a holding system for fixing a line assembly. A fixing band retaining element is provided on the line assembly, which element is provided with at least one guiding element so as to guide a fixing band therein in such a way that it cannot slip off unintentionally once it has been fixed to a holder.

What is claimed is:

1. A holding system for fixing a line assembly, comprising:
   a fixing band; and
   a fixing band retaining element, which is arranged on the line assembly and
   comprises at least one guiding element for receiving the fixing band, the fixing band retaining element comprising two ends, one end being provided with at least one or more cavities or recesses, into which the other end can be plugged or hooked, wherein the guiding element includes a base, and further includes two protrusions between which the fixing band can be received, wherein the two protrusions are arranged on the base, of which a height corresponds substantially to a height of a holding portion of a holder, to which holding portion the line assembly can be fixed by the holding system, wherein at least one protrusion of the guiding element is configured as a locking element, in which the fixing band can be locked into place, wherein the protrusion comprises an undercut in which the fixing band can be locked in to place.

2. The holding system according to claim 1, wherein two, three, four, five or more guiding elements are provided on the fixing band retaining element, the guiding elements each being arranged at regular or irregular distances from one another.

3. The holding system according to claim 1, wherein the fixing band retaining element is configured so as to be wider than the guiding element on one or both sides.

4. The holding system according to claim 1, wherein the length of the ends is selected in such a way that they substantially completely surround the line assembly or form a ring so as to compensate for differences in tolerance.

5. The holding system according to claim 1, wherein the ends each comprise a flattened end portion, the flattened end portions of the two ends being able to be brought into engagement with one another and in doing so being substantially as thick as the fixing band retaining element.

6. The holding system according to claim 1, wherein the fixing band retaining element is at least partly flexible.

7. The holding system according to claim 1, wherein the fixing band retaining element at least partly resilient.

8. The holding system according to claim 1, wherein the fixing band retaining element is made of at least one of silicone, rubber, plastics material and metal.

9. The holding system according to claim 1, wherein the fixing band retaining element is adapted to be fixed to the line assembly by a one-sided or double-sided adhesive tape and/or an adhesive.

10. The holding system according to claim 1 for fixing a line assembly in an aircraft.

11. A holding system for fixing a line assembly, comprising:
    a fixing band; and
    a fixing band retaining element, which is arranged on the line assembly and
    comprises at least one guiding element for receiving the fixing band, the fixing band retaining element comprising two ends, an adhesive tape being provided in a portion in the region of the ends for connecting the ends, and/or at least a further portion of the adhesive tape being arranged on the lower side of the fixing band retaining element, wherein the guiding element includes a base, and further includes two protrusions, between which the fixing band can be received, wherein the two protrusions are arranged on the base, of which a height corresponds substantially to a height of a holding portion of a holder, to which holding portion the line assembly can be fixed by the holding system, wherein at least one of the protrusions of at least one guiding element is configured as a locking element and comprises an undercut in which the fixing band can be locked into place.

12. The holding system according to claim 11, wherein the adhesive tape and/or the adhesive is/are, for example, arranged at least in a portion in the region of the ends so as to connect the ends and/or at least in a further portion to the lower side of the fixing band retaining element.

13. The holding system according to claim 11, wherein the adhesive tape and/or the adhesive is/are arranged at one of the flattened end portions so as to connect the two end portions together.

14. The holding system according to claim 11, wherein the fixing band is a cable tie, tie wrap, cable clamp or cable clip.

15. The holding system according to claim 11, wherein the line assembly comprises at least one hose, at least one tube, one or more electrical lines and/or one or more lines for transporting a fluid or a gaseous medium.

16. The holding system according to claim 11 for fixing a line assembly in an aircraft.

17. The holding system according to claim 1, wherein one end of the fixing band retaining element is provided with at least one or more cavities or recesses, into which the other end of the fixing band retaining element is plugged or hooked.

* * * * *